United States Patent
Yamazaki et al.

(10) Patent No.: US 11,270,826 B2
(45) Date of Patent: Mar. 8, 2022

(54) ELECTRIC SUSPENSION DEVICE

(71) Applicant: HONDA MOTOR CO., LTD., Tokyo (JP)

(72) Inventors: Ryosuke Yamazaki, Wako (JP); Takashi Yanagi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/060,529

(22) Filed: Oct. 1, 2020

(65) Prior Publication Data

US 2021/0101435 A1    Apr. 8, 2021

(30) Foreign Application Priority Data

Oct. 2, 2019 (JP) .............................. JP2019-182380

(51) Int. Cl.
*H01F 7/16* (2006.01)
*H01F 7/08* (2006.01)
(Continued)

(52) U.S. Cl.
CPC ......... *H01F 7/16* (2013.01); *B60G 17/01941* (2013.01); *H01F 7/02* (2013.01); *H01F 7/081* (2013.01); *B60G 2202/424* (2013.01)

(58) Field of Classification Search
CPC .......... B60G 17/01941; B60G 17/0157; B60G 2202/424; B60G 2202/16; B60G 2202/42;
(Continued)

(56) References Cited

U.S. PATENT DOCUMENTS 4,318,038 A * 3/1982 Munehiro ............ H02K 41/031
310/13
5,134,324 A * 7/1992 Sakagami ............ H02K 41/031
104/281
(Continued)

FOREIGN PATENT DOCUMENTS

JP    2004-215375 A    7/2004
JP    2013-507893 A    3/2013
(Continued)

OTHER PUBLICATIONS

Office Action received in corresponding Japanese application No. 2019-182380 dated Jul. 6, 2021 with English translation (6 pages).

*Primary Examiner* — Mohamad A Musleh
(74) *Attorney, Agent, or Firm* — Rankin, Hill & Clark LLP (57) ABSTRACT

A second electric suspension device includes a second electromagnetic actuator that is provided between the vehicle body and a wheel of a vehicle and generates a driving force for damping vibration of the vehicle. The second electromagnetic actuator includes a columnar rod member and a casing surrounding the rod member and being provided capable of moving forward and backward relative to the rod member in the axial direction. Casing-side armature coils are provided in the casing in the axial direction, whereas magnets are provided in the rod member in the axial direction in such a manner as to face part of the casing-side armature coils in the casing. The magnets are formed by permanent magnets and electromagnets including rod-side armature coils.

4 Claims, 4 Drawing Sheets

(51) Int. Cl.
*B60G 17/019* (2006.01)
*H01F 7/02* (2006.01)

(58) Field of Classification Search
CPC ............ B60G 2202/44; B60G 2600/26; B60G 15/00; F16F 6/00; F16F 15/03; F16F 2222/06; H02K 41/031; H01F 2007/086; H01F 7/066; H01F 7/02; H01F 7/081; H01F 7/16; H01F 7/1615
See application file for complete search history.

(56) References Cited

U.S. PATENT DOCUMENTS

| | | | |
|---|---|---|---|
| 2002/0023824 A1* | 2/2002 | Patterson | B65G 27/24 198/766 |
| 2002/0190582 A1* | 12/2002 | Denne | H02K 41/031 310/14 |
| 2006/0226713 A1* | 10/2006 | Lehr | H02K 41/031 310/12.04 |
| 2012/0193172 A1 | 8/2012 | Matscheko et al. | |

FOREIGN PATENT DOCUMENTS

| | | | | |
|---|---|---|---|---|
| JP | 5876764 B2 | 3/2016 | | |
| JP | 2018-182988 A | 11/2018 | | |
| JP | 6417443 B1 | 11/2018 | | |
| WO | WO-2013014780 A1 * | 1/2013 | ........... | H02K 41/031 |

* cited by examiner

ELECTRIC SUSPENSION DEVICE

CROSS-REFERENCE TO RELATED APPLICATION

This application is based upon and claims priority from the Japanese Patent Application No. 2019-182381, filed on Oct. 2, 2019, the entire contents of which are incorporated herein by reference.

BACKGROUND OF THE INVENTION

1. Field of the Invention

The present invention relates to an electric suspension device including an electromagnetic actuator that is provided between the vehicle body and a wheel of a vehicle and generates a driving force for damping vibration of the vehicle.

2. Description of the Related Art

The applicant of the present application has proposed an electric suspension device including an electromagnetic actuator that is provided between the vehicle body and a wheel of a vehicle and generates a driving force for damping vibration of the vehicle (see, for example, Japanese Patent No. 6417443 (Patent Document 1)). The electromagnetic actuator according to Patent Document 1 is configured with a ball screw mechanism in addition to an electric motor. The electromagnetic actuator translates the rotational motion of the electric motor to the linear motion of the ball screw mechanism and thereby generates a driving force for damping vibration of the vehicle.

There is also known an electromagnetic actuator in an electric suspension device that uses a linear motor (see, for example, Japanese Patent No. 5876764 (Patent Document 2)). The electromagnetic actuator according to Patent Document 2 includes a columnar stator and a tubular rotor surrounding the stator and being provided capable of moving forward and backward axially. The stator is provided with armature coils placed axially around the outer circumferential surface of the column. The rotor is provided with permanent magnets placed axially around the inner circumferential surface of the tube in such a manner as to face the armature coils provided on the stator.

In the electric suspension device according to Patent Document 2, the rotor is driven to extend or contract axially relative to the stator by using attractive and repulsive forces generated between the armature coils of the stator and the permanent magnets of the rotor when the armature coils of the stator are energized.

Further, Japanese Patent Application Publication No. 2018-182988 (Patent Document 3) discloses an example of an electric suspension device which is a modification of the electromagnetic actuator according to Patent Document 2. Specifically, an electromagnetic actuator according to Patent Document 3 includes a columnar stationary portion (a rod portion) and a tubular movable portion surrounding the rod portion and being provided capable of moving forward and backward axially. The rod portion is provided with permanent magnets placed axially around the outer circumferential surface of the column. The movable portion is provided with armature coils placed axially around the inner circumferential surface of the tube in such a manner as to face the permanent magnets provided on the rod portion.

According to the electric suspension device according to Patent Document 3, the movable portion is driven to extend and contract axially relative to the rod portion by using attractive and repulsive forces generated between the armature coils of the movable portion and the permanent magnets provided on the rod portion when the armature coils of the tubular movable portion are energized.

However, the electric suspension devicees according to Patent Documents 2 and 3, which use a linear motor as an electromagnetic actuator, make no special consideration for reducing or stopping the use of permanent magnets.

Thus, the electromagnetic suspension apparatuses of Patent Documents 2 and 3 have room for improvement in the following point. Specifically, neodymium magnets, which are high in residual magnetic flux density and resistant to heat, are frequently used as the permanent magnets for motors to meet the demands for compactness and high output power (high energy density). The neodymium magnets require addition of rare earths, which are rare and expensive. Then, motors using permanent magnets like neodymium magnets face a problem in terms of mass production because of the difficulty in securing rare earths, and also, use of permanent magnets (neodymium magnets) becomes a factor in increasing the costs.

SUMMARY OF THE INVENTION

The present invention has been made under the above circumstances, and has an objective to provide an electric suspension device that does not hinder mass production and can reduce manufacturing costs as much as possible even if a linear motor is used as its electromagnetic actuator.

To achieve the above objective, a first aspect of the present invention provides an electric suspension device with the following major features, or specifically, an electric suspension device comprising an electromagnetic actuator that is provided between a vehicle body and a wheel of a vehicle and generates a driving force for damping vibration of the vehicle, wherein the electromagnetic actuator includes a rod member and a casing extending in an axial direction of the rod member and surrounding the rod member. The rod member and the casing are provided capable of moving forward and backward in the axial direction. A plurality of armature coils are provided in the casing in the axial direction, whereas a plurality of magnets are provided in the rod member in the axial direction in such a manner as to face part of the plurality of armature coils provided in the casing. The plurality of magnets are formed by permanent magnets and electromagnets including armature coils.

The present invention does not hinder mass production and can reduce manufacturing costs as much as possible even if a linear motor is used as its electromagnetic actuator.

DETAILED DESCRIPTION OF THE EMBODIMENTS

With reference to the drawings when necessary, a detailed description is given below of an electric suspension device according to a reference example and an embodiment of the present invention.

Note that throughout the drawings, members having a common function are denoted by a common reference numeral. Also, for the convenience of illustration, some drawings may schematically depict the size and shape of a member in a modified or exaggerated manner.

[The Overall Configuration of a First Electric Suspension Device 11A According to a Reference Example of the Present Invention]

First, the overall configuration of the first electric suspension device 11A according to a reference example of the present invention is described with reference to FIGS. 1, 2A, and 2B.

Figure 1:
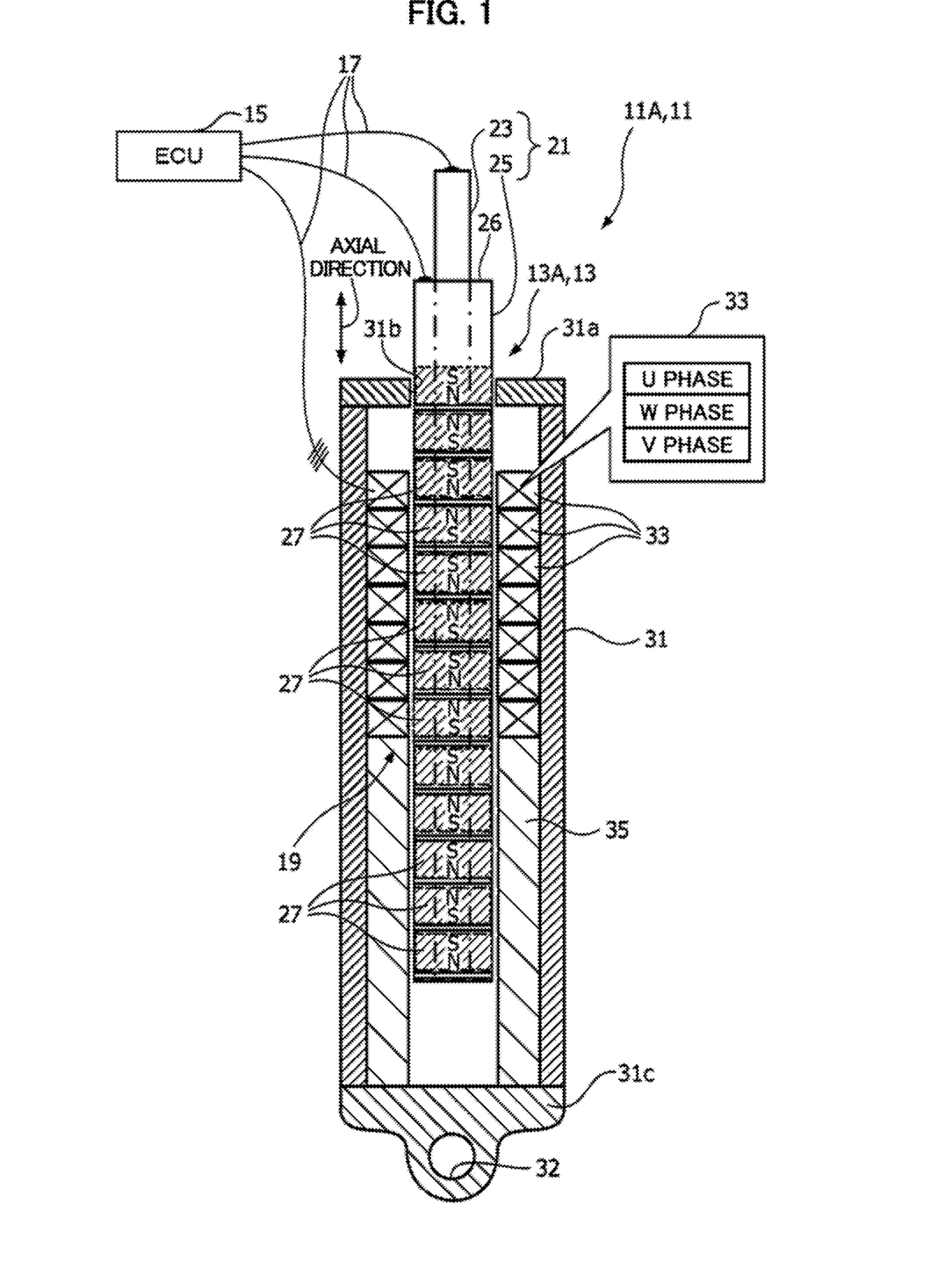
FIG. 1 is a diagram depicting the overall configuration of a first electric suspension device according to a reference example of the present invention.

FIG. 1 is a diagram depicting the overall configuration of the first electric suspension device 11A according to a reference example of the present invention. FIG. 2A is a perspective view depicting the outer appearance of a rod-side armature coil 27 provided to a rod member 21 in a first electromagnetic actuator 13A of the first electric suspension device 11A. FIG. 2B is a partial longitudinal sectional view depicting a part of the rod member 21 in the first electromagnetic actuator 13A.

As shown in FIG. 1, the first electric suspension device 11A according to the reference example of the present invention is configured with the first electromagnetic actuator 13A that generates a driving force for damping vibration of a vehicle (not shown), and one electronic control unit (ECU) 15. The first electromagnetic actuator 13A and the ECU 15 are connected to each other via control power supply lines 17 for supplying drive control power to the first electromagnetic actuator 13A.

There are four first electromagnetic actuators 13A provided in total, one for each of the vehicle's front wheels (i.e., the front left wheel and the front right wheel) and rear wheels (i.e., the rear left wheel and the rear right wheel). The first electromagnetic actuators 13A for the respective wheels are driven and controlled by the ECU 15 independently from one another in accordance with the extension and contraction driving of the respective wheels.

In the embodiments of the present invention, the first electromagnetic actuators 13A have the same configuration. For this reason, a description is given for the configuration of only one first electromagnetic actuator 13A, thereby omitting descriptions for the rest of the first electromagnetic actuators 13A.

The first electromagnetic actuator 13A uses a linear motor 19 (to be detailed later) as a source to generate a driving force for damping vibration of the vehicle. More specifically, the first electromagnetic actuator 13A is configured with, as shown in FIG. 1, the columnar rod member 21 and a tubular casing 31 extending in the axial direction of the rod member 21 and surrounding the rod member 21. The rod member 21 and the casing 31 are provided capable of moving forward and backward in the axial direction of the rod member 21.

That the rod member 21 and the casing 31 are provided capable of moving forward and backward in the axial direction of the rod member 21 includes all of the following modes: a mode where the rod member 21 is driven forward and backward axially relative to the casing 31, the casing 31 is driven forward and backward axially relative to the rod member 21, and a mode where the rod member 21 and the casing 31 are both driven forward and backward axially with relative to each other.

More specifically, the rod member 21 has a function to be driven forward and backward axially relative to the casing 31 by a driving force from the linear motor 19. To implement this function, the rod member 21 is, as shown in FIG. 1, configured with a columnar shaft 23 and a tubular pipe portion 25 surrounding the shaft 23. The shaft 23 and the pipe portion 25 are situated concentrically.

The shaft 23 and a pipe portion 25 are made of a conductive member. This is because, in the embodiments of the present invention, the shaft 23 and the pipe portion 25 themselves are used as a power supply passage 24 (see FIG. 2B) for the rod-side armature coils 27. Alternatively, the shaft 23 and the pipe portion 25 may be configured with a non-conductive member. In such a case, a conductivity surface treatment is performed on the shaft 23 and the pipe portion 25 to ensure that they function as the power supply passage 24 for the rod-side armature coils 27.

Specifically, for example, if stainless steel is used as a material for the shaft 23 and the pipe portion 25, coatings which are highly conductive and resistant to abrasion, such as a layer created by electroless nickel-boron plating and a diamond-like carbon (DLC) coating, may be formed on the exposed surface(s) of the material.

Note that if stainless steel is used as a material for the shaft 23, the conductivity surface treatment is performed on the outer circumferential surface of the columnar shaft 23. If stainless steel is used as a material for the pipe portion 25, the conductivity surface treatment is performed on the inner circumferential surface (and also preferably the outer circumferential surface) of the tubular pipe portion 25.

As shown in FIG. 1, in a gap 26 between the shaft 23 and the pipe portion 25, a plurality of rod-side armature coils 27 (see FIGS. 2A and 2B) are provided axially in a stacked manner, facing some of a plurality of casing-side armature coils 33 (to be detailed later) provided in the casing 31. The rod-side armature coils 27 correspond to the "armature coils" provided in the "rod member" of the present invention.

Figure 2A:
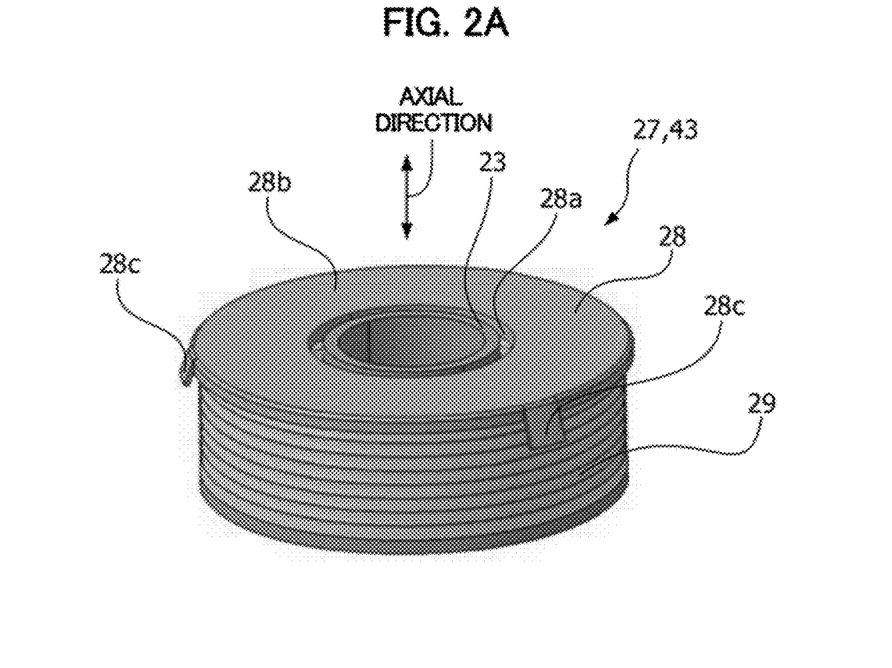
FIG. 2A is a perspective view depicting the outer appearance of a rod-side armature coil provided in a rod member of a first electromagnetic actuator of the first electric suspension device.
Figure 2B:
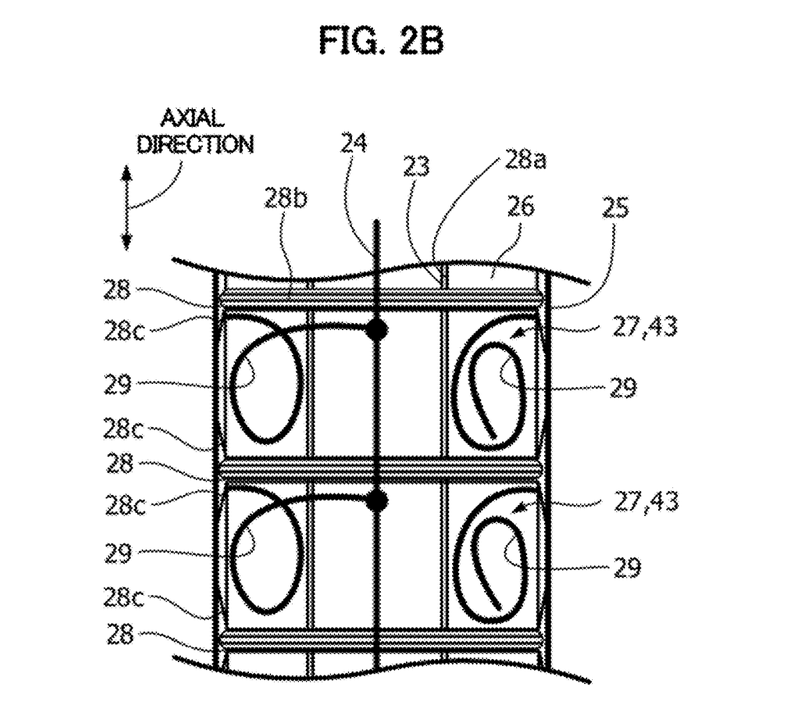
FIG. 2B is a partial longitudinal sectional view depicting a part of the rod member in the first electromagnetic actuator.

The rod-side armature coils 27 are, as shown in FIGS. 2A and 2B, constructed of a bobbin 28 and a sheathed electric wire 29 which is wound around the bobbin 28. Although there is no particular limitation, the bobbin 28 is made of a conductive metallic material such as, for example, aluminum. As shown in FIG. 2A, a circular, axially-extending pass hole 28a is formed in the bobbin 28 at the center thereof in the radial direction. The sheathed electric wire 29 is made of a metallic, for example copper, conductive wire sheathed with an insulating resin or the like.

A first end of the sheathed electric wire 29 is electrically connected to the pass hole 28a of the bobbin 28, whereas a second end of the sheathed electric wire 29 is electrically connected to a disc-shaped side end plate 28b of the bobbin 28. When the rod-side armature coils 27 are provided in a stacked manner in the gap 26 between the shaft 23 and the pipe portion 25, the rod-side armature coils 27 are joined to one another with an insulating adhesive (not shown) interposed between each adjacent pair of the rod-side armature coils 27.

As a result, the side end plates 28b of the bobbins 28 of the adjacent rod-side armature coils 27 are electrically insulated from each other.

The side end plate 28b of the bobbin 28 is provided with a plurality of tongue pieces 28c throughout the circumference thereof, the tongue pieces 28c being slanted, protruding outward in the radial direction.

The pass hole 28a of the bobbin 28 is electrically insulated from the side end plate 28b of the bobbin 28.

The inside diameter of the pass hole 28a of the bobbin 28 is formed slightly larger than the outside diameter of the shaft 23. Also, the outside diameter of the side end plate 28b of the bobbin 28 is formed slightly smaller than the inside diameter of the pipe portion 25.

To place the rod-side armature coils 27 in the rod member 21, the pass hole 28a of the bobbin 28 is inserted around the shaft 23, and the rod-side armature coils 27 are placed axially in the gap 26 between the shaft 23 and the pipe portion 25 in a restrained manner.

In other words, when the rod-side armature coil 27 is in the rod member 21, the outer circumferential surface of the shaft 23 is in close contact with the inner circumferential surface of the pass hole 28a of the bobbin 28 of the rod-side armature coil 27. Likewise, the side endplate 28b (or particularly the tongue pieces 28c of the side end plate 28b) of the bobbin 28 of the rod-side armature coil 27 is in close contact with the inner circumferential surface of the pipe portion 25.

The above configuration allows the rod-side armature coil 27 to be in electrical conduction with the shaft 23 and the pipe portion 25 of the rod member 21 and helps to prevent a loose connection due to vibration.

Thus, when the control power supply lines 17 for the rod-side armature coils 27 are connected to the ECU 15 and are connected to the shaft 23 and the pipe portion 25, the power supply passage 24 (see FIG. 2B) for the rod-side armature coils 27 is formed, the power supply passage 24 extending from the shaft 23 to the pass hole 28a of the bobbin 28, to the rod-side armature coil 27 (i.e., the first end of the sheathed electric wire 29 to the second end of the sheathed electric wire 29), to the side end plate 28b of the bobbin 28, and to the pipe portion 25.

When power is supplied to the rod-side armature coils 27 through the power supply passage 24, as shown in FIG. 1, the south pole and the north pole appear at the end portions of each rod-side armature coil 27 in the axial direction in accordance with the flow direction of currents to the sheathed electric wire 29 of the rod-side armature coil 27. In the example shown in FIG. 1, if the rod-side armature coils 27 are used as electromagnets, the south and north poles appear alternately in the axial direction at one ends and the other ends of the rod-side armature coils 27 in the axial direction.

As shown in FIG. 1, a circular upper lid body 31a is provided at an upper end portion of the casing 31 to close the upper end portion. The upper lid body 31a is provided with a circular through-hole 31b. Through this through-hole 31b, one of the end portions of the rod member 21 is exposed from the upper lid body 31a provided to the casing 31. A circular lower lid body 31c is provided at a lower end portion of the casing 31 to close the lower end portion. The lower lid body 31c is provided with a joint portion 32 formed of a bolt insertion hole.

In the first electromagnetic actuator 13A, the joint portion 32 of the casing 31 is joined and secured to an unsprung member (not shown) (such as a lower arm or a knuckle on the wheel side). Meanwhile, the upper end portion of the rod member 21 is joined and secured to a sprung member (not shown) (such as a strut tower portion on the vehicle body side). In other words, the first electromagnetic actuator 13A is placed side by side with a spring member (not shown) provided between the vehicle body and a wheel of the vehicle.

As shown in FIG. 1, the casing-side armature coils 33 are provided axially on the inner circumferential surface of the casing 31 in such a manner as to face the rod-side armature coils 27 provided in the rod member 21 in a stacked manner.

Each of the casing-side armature coils 33 is formed as a three-phase coil with U phase, W phase, and V phase, as shown in FIG. 1. The casing-side armature coils 33 correspond to the "armature coils" provided to the "casing" in the present invention.

Each of the casing-side armature coils 33 is connected to the ECU 15 via a control power supply line 17. The ECU 15 is configured to energize the three-phase (U phase, W phase, and V phase) coils of the casing-side armature coils 33 sequentially in accordance with three-phase driving control signals generated by an inverter (not shown) in the ECU 15.

As shown in FIG. 1, a tubular guide member 35 is attached to the inner circumferential surface of the casing 31 to guide the forward and backward motion of the rod member 21.

In the first electromagnetic actuator 13A, the rod-side armature coils 27 provided axially in the rod member 21 and the casing-side armature coils 33 provided axially in the casing 31 form the linear motor 19 shown in FIG. 1.

The linear motor 19 drives the casing 31 to extend and contract axially relative to the rod member 21 by using attractive and repulsive forces generated between the rod-side armature coils 27 and the casing-side armature coils 33 when they are energized.

The first electromagnetic actuator 13A configured as above operates as follows. Specifically, an example case is considered here where a propulsive force related to upthrust vibration is applied to the joint portion 32 of the casing 31 from the wheel side of the vehicle. In this case, along with the casing 31 having received the propulsive force related to upthrust vibration, the rod member 21 tries to move in an upthrust manner as well. In this event, the linear motor 19 is caused to generate a driving force in a direction to negate the upthrust movement of the rod member 21.

When the linear motor 19 is thus caused to generate a driving force in a direction to negate the upthrust movement of the rod member 21, vibration trying to be conveyed from the wheel side to the vehicle body side can be damped.

According to the first electric suspension device 11A according to the reference example of the present invention, the rod-side armature coils 27 are used in place of the permanent magnets generally used as a component of an existing linear motor 19. Thus, even if the linear motor 19 is used as an electromagnetic actuator, mass production is not hindered, and manufacturing costs can be reduced as much as possible.

Further, according to the first electric suspension device 11A according to the reference example of the present invention, the shaft 23 and the pipe portion 25 of the rod member 21 themselves are used as the power supply passage 24 for the rod-side armature coils 27. Thus, power supply to the armature coils provided in the rod member 21 can be performed through the shaft 23 and the pipe portion 25 of the rod member 21.

As a result, when the rod-side armature coils 27 are provided in the rod member 21 in a stacked manner, a wiring part for the power supply passage 24 can be simplified, and wiring space can be omitted.

[The Overall Configuration of a Second Electric Suspension Device 11B According to an Embodiment of the Present Invention]

Next, the overall configuration of a second electric suspension device 11B according to an embodiment of the present invention is described with reference to FIGS. 3A and 3B.

Figure 3A:
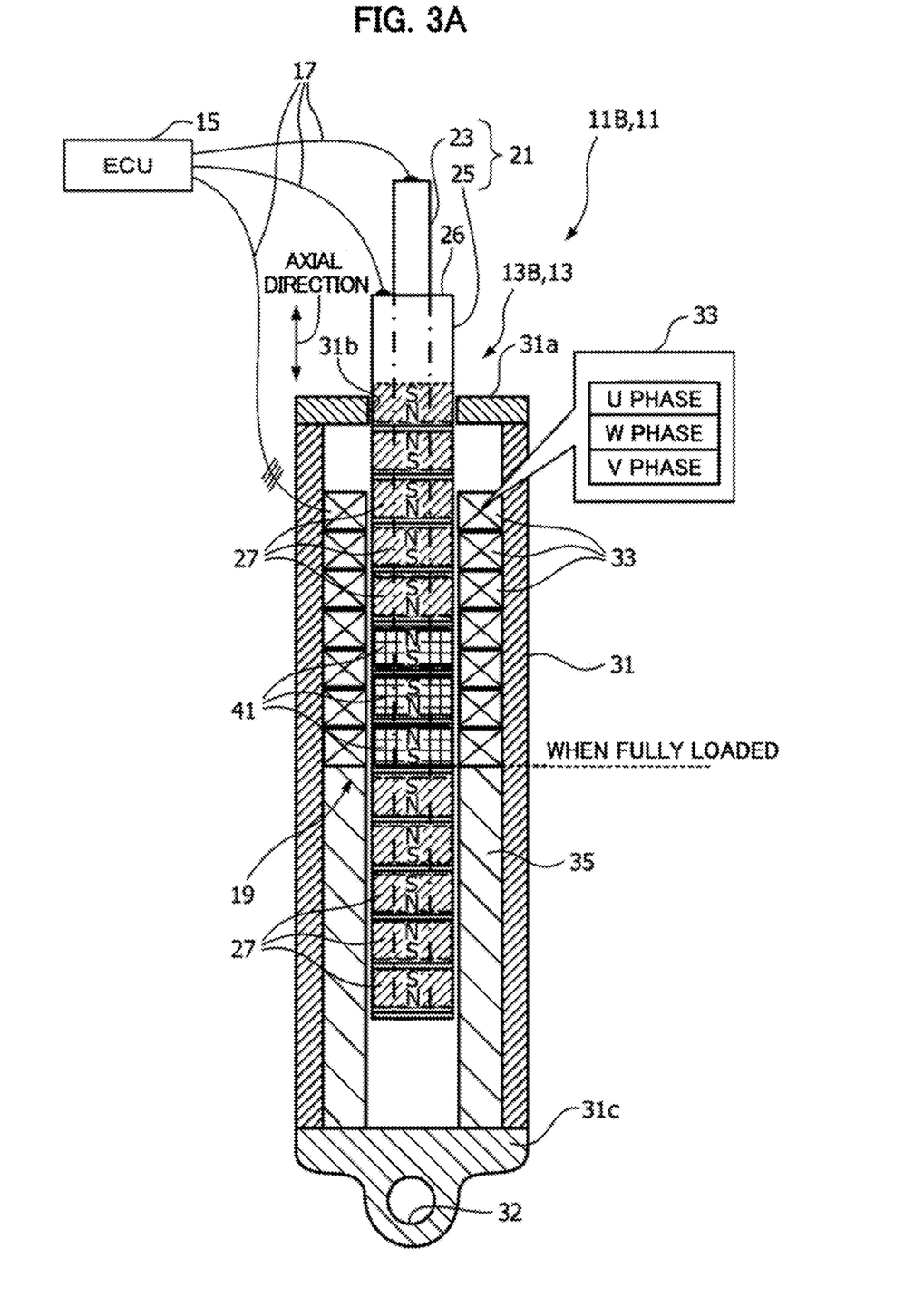
FIG. 3A is a diagram depicting the overall configuration of a second electric suspension device according to an embodiment of the present invention.
Figure 3B:
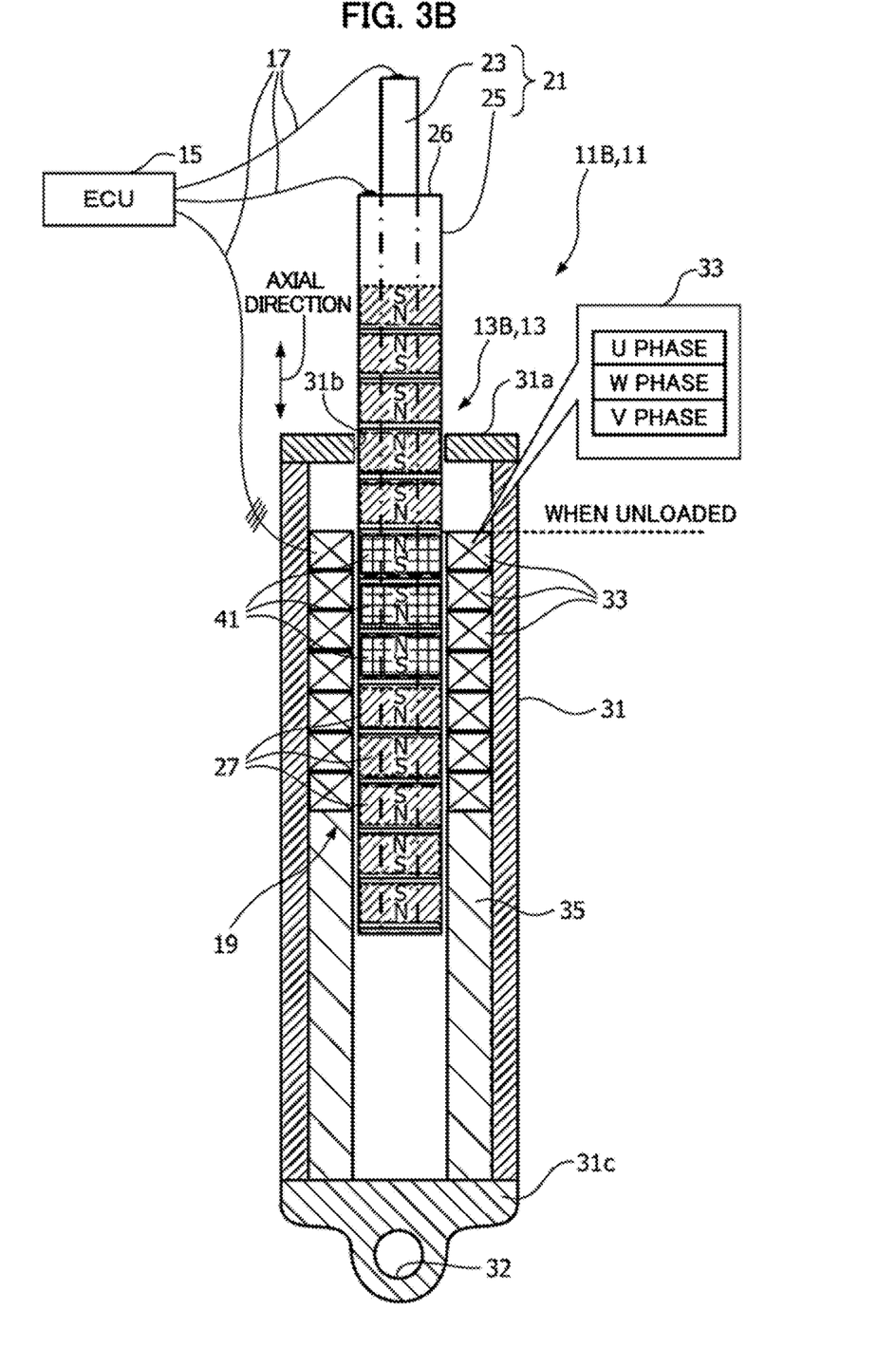
FIG. 3B is a diagram depicting the overall configuration of the second electric suspension device according to the embodiment of the present invention.

FIGS. 3A and 3B are diagrams depicting the overall configuration of the second electric suspension device 11B according to the embodiment of the present invention. Specifically, FIG. 3A shows how a second electromagnetic actuator 13B is extended or contracted when the vehicle is stopped and fully loaded, and FIG. 3B shows how the second electromagnetic actuator 13B is extended or contracted when the vehicle is stopped and unloaded.

Basic components of the second electric suspension device 11B are common to those of the first electric suspension device 11A described above. Thus, only differences between them are focused and described to omit the full description of the second electric suspension device 11B.

Note that in the following description, when referred to collectively, the first electric suspension device 11A and the second electric suspension device 11B are referred to simply as an "electric suspension device 11." Also, when referred to collectively, the first electromagnetic actuator 13A and the second electromagnetic actuator 13B are referred to simply as an "electromagnetic actuator 13."

In the first electromagnetic actuator 13A of the first electric suspension device 11A, the rod-side armature coils 27 are provided in the rod member 21 axially in a stacked manner. The rod member 21 is provided with no permanent magnets as components replacing the rod-side armature coils 27.

By contrast, in the second electric suspension device 11B as shown in FIGS. 3A and 3B, a plurality of permanent magnets 41 are provided in the rod member 21 axially in a stacked manner along with the rod-side armature coils 27. The permanent magnets 41 are arranged in the rod member 21 in such a manner as to be sandwiched between the rod-side armature coils 27 axially.

What is meant by "a plurality of magnets are provided in the rod member in the axial direction in such a manner as to face part of the plurality of armature coils provided in the casing" in the present invention is that, as shown in FIGS. 3A and 3B, the rod-side armature coils 27 and the permanent magnets 41 are provided axially in the rod member 21 of the second electric suspension device 11B in such a manner as to face part of the casing-side armature coils 33 provided in the casing 31.

Further, what is meant by "the plurality of magnets are formed by permanent magnets and electromagnets including armature coils" in the present invention is that, as shown in FIGS. 3A and 3B, the plurality of magnets provided in the rod member 21 are formed by the permanent magnets 41 and electromagnets 43 including the rod-side armature coils 27.

Furthermore, what is meant by "the permanent magnets among the plurality of magnets are arranged in the rod member in such a manner as to be sandwiched between the plurality of electromagnets in the axial direction" in the present invention is that, as shown in FIGS. 3A and 3B, the permanent magnets 41 are arranged in the rod member 21 in such a manner as to be sandwiched between the rod-side armature coils 27 axially.

Moreover, in the second electric suspension device 11B, as shown in FIGS. 3A and 3B in comparison, the permanent magnets 41 among the plurality of magnets are arranged in the rod member 21 in such a manner as to always face the casing-side armature coils 33 provided in the casing 31 in a case where the rod member 21 is situated within a stroke range of the rod member 21 relative to the casing 31, the stroke range being from where the rod member 21 is situated when the vehicle is stopped and unloaded to where the rod member 21 is situated when the vehicle is stopped and fully loaded.

A case assumed by "the rod member 21 is situated within a stroke range of the rod member 21 relative to the casing 31, the stroke range being from where the rod member 21 is situated when the vehicle is stopped and unloaded to where the rod member 21 is situated when the vehicle is stopped and fully loaded" is where the rod member 21 is situated in the stroke range generally used while the vehicle is driving under normal conditions.

The (axial) position of the rod member 21 is defined by its relation relative to the casing 31. In the present invention, damping of vibration trying to be conveyed from the wheel side to the vehicle body side is attempted by the extension or contraction of the rod member 21 relative to the casing 31. In other words, to obtain the vibration damping effect, a sufficient extension/contraction margin is required on both the extension side and the contraction side for the (axial) position of the rod member 21 relative to the casing 31.

Further, to obtain a high vibration damping effect, the permanent magnets 41 in the rod member 21 preferably face the casing-side armature coils 33 in the casing 31 at any time, as shown in FIGS. 3A and 3B.

What is meant by "the permanent magnets 41 among the plurality of magnets are arranged in the rod member 21 in such a manner as to always face the casing-side armature coils 33 provided in the casing 31" is that the permanent magnets 41 are arranged in the rod member 21 in such a manner that very strong attractive and repulsive forces can be created by the interaction between the magnetic field generated by the permanent magnets 41 and the magnetic field generated by energization of the casing-side armature coils 33.

Also, what is meant by "the permanent magnets 41 among the plurality of magnets are arranged in the rod member 21 in such a manner as to always face the casing-side armature coils 33 provided in the casing 31 in a case where the rod member 21 is situated within a stroke range of the rod member 21 relative to the casing 31, the stroke range being from where the rod member 21 is situated when the vehicle is stopped and unloaded to where the rod member 21 is situated when the vehicle is stopped and fully loaded" is that the permanent magnets 41 are arranged at positions in the rod member 21 that allow very strong attractive and repulsive forces to be created in a case where the rod member 21 is situated within the stroke range generally used when the vehicle is driving under normal conditions.

Thereby, a driving force of the highest level can be generated by the linear motor 19 in a case where the rod member 21 (or the permanent magnets 41 provided therein) is situated within the stroke range generally used when the vehicle is driving under normal conditions. Thus, vibration trying to be conveyed from the wheel side to the vehicle body side can be damped more efficiently than in a case where the rod member 21 (or the permanent magnets 41 provided therein) is situated within a stroke range used when the vehicle is driving under abnormal conditions.

[The Operation and Advantageous Effects of the Second Electric Suspension Device 11B According to the Embodiment of the Present Invention]

The operation and advantageous effects of the second electric suspension device 11B according to the embodiment of the present invention are described in comparison with the electric suspension devicees according to Patent Document 2 (Japanese Patent No. 5876764) and Patent Document 3 (Japanese Patent Application Publication No. 2018-182988).

As described above, the electric suspension devicees according to Patent Documents 2 and 3 make no special consideration for reducing or stopping the use of permanent magnets.

Thus, the electromagnetic suspension apparatuses of Patent Documents 2 and 3 have room for improvement in the following point.

Specifically, neodymium magnets, which are high in residual magnetic flux density and resistant to heat, are frequently used as the permanent magnets for motors to meet the demands for compactness and high output power (high energy density). However, the neodymium magnets require addition of rare earths, which are rare and expensive. Then, motors using permanent magnets like neodymium magnets face a problem in terms of mass production because of the difficulty in securing rare earths, and also, use of permanent magnets (neodymium magnets) becomes a factor in increasing the costs.

Thus, the electric suspension device 11 (the second electric suspension device 11B) based on a first aspect of the present invention is configured as follows. Specifically, the electric suspension device 11 comprises the electromagnetic actuator 13 (the second electromagnetic actuator 13B) that is provided between a vehicle body and a wheel of a vehicle and generates a driving force for damping vibration of the vehicle, wherein the electromagnetic actuator 13 includes the rod member 21 and the casing 31 extending in the axial direction of the rod member 21 and surrounding the rod member 21. The rod member 21 and the casing 31 are provided capable of moving forward and backward in the axial direction. The plurality of casing-side armature coils (armature coils) 33 are provided in the casing 31 in the axial direction, whereas the plurality of magnets 41, 43 are provided in the rod member 21 in the axial direction in such a manner as to face part of the casing-side armature coils (armature coils) 33 provided in the casing 31. The plurality of magnets 41, 43 are formed by permanent magnets 41 and electromagnets 43 including the rod-side armature coils (armature coils) 27.

In the electric suspension device 11 based on the first aspect, the plurality of magnets 41, 43 provided in the axial direction of the rod member 21 are formed by the permanent magnets 41 and the electromagnets 43 including the rod-side armature coils (armature coils) 27. Thus, use of permanent magnets like neodymium magnets can be reduced as much as possible.

According to the electric suspension device 11 based on the first aspect, as a result of the use of permanent magnets like neodymium magnets being reduced as much as possible, even if the linear motor 19 is used as an electromagnetic actuator, mass production is not hindered, and manufacturing costs can be reduced as much as possible.

Further, the electric suspension device 11 based on a second aspect is based on the electric suspension device 11 (the second electric suspension device 11B) based on the first aspect and may be configured as follows. Specifically, the permanent magnets 41 among the plurality of magnets 41, 43 may be arranged in the rod member 21 in such a manner as to always face the casing-side armature coils 33 provided in the casing 31 in a case where the rod member 21 is situated within a stroke range of the rod member 21 relative to the casing 31, the stroke range being from where the rod member 21 is situated when the vehicle is stopped and unloaded to where the rod member 21 is situated when the vehicle is stopped and fully loaded.

According to the electric suspension device 11 based on the second aspect, a driving force of the highest level can be generated by the linear motor 19 in a case where the rod member 21 (or the permanent magnets 41 provided therein) is situated within the stroke range generally used when the vehicle is driving under normal conditions. Thus, vibration trying to be conveyed from the wheel side to the vehicle body side can be damped more efficiently than in a case where the rod member 21 is situated within a stroke range used when the vehicle is driving under abnormal conditions.

Further, the electric suspension device 11 based on a third aspect is based on the electric suspension device 11 (the second electric suspension device 11B) based on the first or second aspect and may be configured as follows. Specifically, the permanent magnets 41 among the plurality of magnets 41, 43 may be arranged in the rod member 21 in such a manner as to be sandwiched between the plurality of electromagnets 43 in the axial direction.

In the electric suspension device 11 based on the third aspect, the permanent magnets 41 are arranged in the rod member 21 in such a manner as to be sandwiched between the electromagnets 43 in the axial direction. Thus, in a middle stroke range of the maximum possible stroke range of the rod member 21, that is, within or close to the stroke range generally used, very strong attractive and repulsive forces can be created due to the interaction between the magnetic field generated by the permanent magnets 41 and the magnetic field generated by energization of the casing-side armature coils 33.

According to the electric suspension device 11 based on the third aspect, very strong attractive and repulsive forces can be created within or close to the stroke range generally used, due to the interaction between the magnetic field generated by the permanent magnets 41 and the magnetic field generated by energization of the casing-side armature coils 33. Thus, vibration trying to be conveyed from the wheel side to the vehicle body side can be damped more efficiently than in a case where the rod member 21 is situated within a stroke range used when the vehicle is driving under abnormal conditions.

Other Embodiments

The embodiments described above have been given to show examples of how the present invention may be embodied. Hence, the embodiments should not be interpreted to limit the technical scope of the present invention, because the present invention can be implemented in various modes without departing from the gist and key features of the present invention.

For example, in the example described above, the first electromagnetic actuator 13A in the electric suspension device 11 according to the embodiment of the present invention is configured with the columnar rod member 21 and the tubular casing 31 extending in the axial direction of the rod member 21 and surrounding the rod member 21. However, the present invention is not limited to this example.

For instance, the rod member 21 may have any other cross-sectional shape, such as an oval. In this case, the casing may have a cross-sectional shape such that the inner circumferential wall of the casing 31 can receive the outer circumferential wall of the rod member 21 with a slight gap between them.

Also, in the first electromagnetic actuator 13A in the electric suspension device 11 according to the embodiment of the present invention, the number of permanent magnets 41 provided in the rod member 21 is not limited to the number disclosed in the embodiments of the present invention, and can be set appropriately according to the designs and specifications as the linear motor 19.

Similarly, the number of electromagnets 43 including the rod-side armature coils 27 provided in the rod member 21 is not limited to the number disclosed in the embodiments of the present invention either, and can be set appropriately according to the designs and specifications as the linear motor 19.

Similarly, the number of casing-side armature coils 33 provided in the casing 31 is not limited to the number disclosed in the embodiments of the present invention either, and can be set appropriately according to the designs and specifications as the linear motor 19.

Moreover, in the first electromagnetic actuator 13A in the electric suspension device 11 according to the embodiment of the present invention, the orientation of the magnetic poles of the permanent magnets 41 provided in the rod member 21 is not limited to the orientation disclosed in the embodiments of the present invention, and can be set appropriately according to the designs and specifications as the linear motor 19.

Similarly, the orientation of the electromagnets 43 including the rod-side armature coils 27 provided in the rod member 21 is not limited to the orientation disclosed in the embodiments of the present invention either, and can be set appropriately according to the designs and specifications as the linear motor 19.

Similarly, the orientation of the casing-side armature coils 33 provided in the casing 31 is not limited to the orientation disclosed in the embodiments of the present invention either, and can be set appropriately according to the designs and specifications as the linear motor 19.

Further, in the example of the electric suspension device 11 according to the embodiments of the present invention described above, there are four first electromagnetic actuators 13 provided in total, for both of the front wheels (the front left and front right wheels) and the rear wheels (the rear left and rear right wheels). However, the present invention is not limited to this example. Two electromagnetic actuators 13 may be provided in total, one for each of the front wheels or each of the rear wheels.

What is claimed is:

1. An electric suspension device comprising an electromagnetic actuator that is provided between a vehicle body and a wheel of a vehicle and generates a driving force for damping vibration of the vehicle, wherein
    the electromagnetic actuator includes a rod member and a casing extending in an axial direction of the rod member and surrounding the rod member,
    the rod member and the casing are provided capable of moving forward and backward in the axial direction,
    a plurality of armature coils are provided in the casing in the axial direction,
    a plurality of magnets are provided in the rod member in the axial direction in such a manner as to face part of the plurality of armature coils provided in the casing, and
    the plurality of magnets are formed by permanent magnets and electromagnets including armature coils.

2. The electric suspension device according to claim 1, wherein
    the permanent magnets among the plurality of magnets are arranged in the rod member in such a manner as to always face the armature coils provided in the casing in a case where the rod member is situated within a stroke range of the rod member relative to the casing, the stroke range being from where the rod member is situated when the vehicle is stopped and unloaded to where the rod member is situated when the vehicle is stopped and fully loaded.

3. The electric suspension device according to claim 1, wherein
    the permanent magnets among the plurality of magnets are arranged in the rod member in such a manner as to be sandwiched between the plurality of electromagnets in the axial direction.

4. The electric suspension device according to claim 2, wherein
    the permanent magnets among the plurality of magnets are arranged in the rod member in such a manner as to be sandwiched between the plurality of electromagnets in the axial direction.

* * * * *